Nov. 26, 1968 E. J. FREEH 3,413,474
COATING THICKNESS DETERMINATION BY MEANS OF MEASURING BLACK-BODY
RADIATION RESULTANT FROM INFRARED IRRADIATION
Filed Feb. 3, 1965
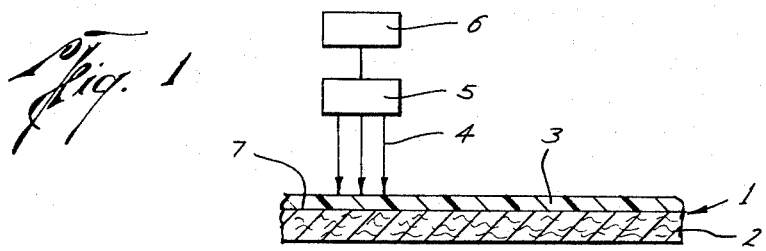
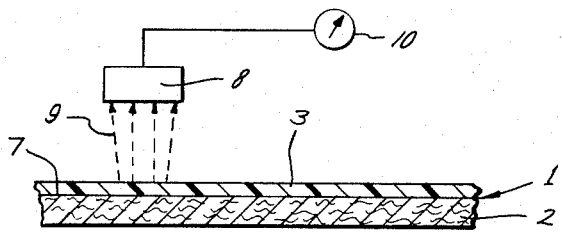
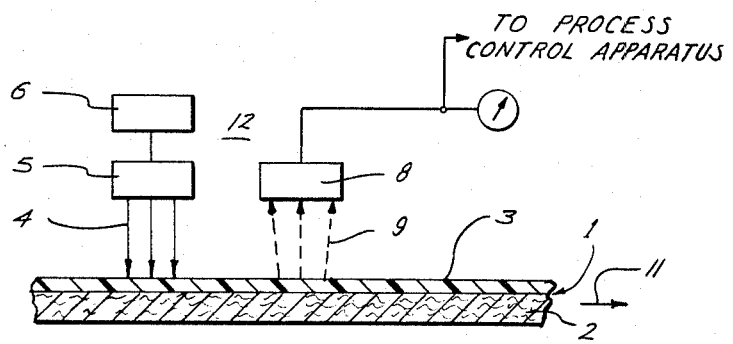
Edward J. Freeh
INVENTOR.
BY William T. Fryer III
ATTORNEY United States Patent Office 3,413,474
Patented Nov. 26, 1968

3,413,474
COATING THICKNESS DETERMINATION BY MEANS OF MEASURING BLACK-BODY RADIATION RESULTANT FROM INFRARED IRRADIATION
Edward J. Freeh, Tucson, Ariz., assignor to the Industrial Nucleonics Corporation, a corporation of Ohio
Filed Feb. 3, 1965, Ser. No. 429,982
8 Claims. (Cl. 250—83.3)

ABSTRACT OF THE DISCLOSURE

A coating thickness gauge measures the black-body radiation from a coated substrate irradiated by infrared radiation which is at least partially absorbed by the coating. The black-body radiation is a function of the coating thickness.

---

This invention relates to the measurement of material characteristics. More particularly, the invention is concerned with an improved method for measuring the thickness of a coating on a substrate using infrared radiation.

The measurement of coating thickness has been important to several industries. For example, paper products, such as cartons, are coated with a plastic film, and metal products, such as tin cans, have a rust preventive, metallic film.

In referring to the measurement of thickness of a coating with infrared radiation, it is more accurate to speak in units of weight per unit area. Most radiation devices respond to the product of density and thickness, generally termed weight per unit area. For the subsequent presentation and claims the term thickness will be used in a general sense to embrace the measurement of weight per unit area, density, or thickness (caliper), which is the common practice.

The demand for thickness gauges was due to the need to determine if a coating was adequate to meet certain standards. Generally, if a gauge had only a fair accuracy, the coating was always made thicker than necessary to be safe, increasing the cost of the product. More accurate gauges would permit a closer control of the coating thickness to the standard required and save raw material.

It is one of the objects of the present invention to improve the accuracy for measuring coating thickness.

Another consideration in using apparatus for coating thickness measurement is the cost and size of the measuring equipment. What is desired is a relatively simple, reliable gauge that has moderate cost and is easy to use.

It is a further object of the present invention to provide a method of measuring coating thickness which has the advantages of using apparatus of reasonable cost and which can be operated with a minimum of difficulty.

Other objects of the invention will be apparent.

Many forms of apparatus have been proposed using infrared radiation for material characteristic measurement. In general, these devices have employed a source of infrared radiation that irradiated the material. A detector measured the radiation from the material, either after passing through the material or being reflected therefrom. The radiation wavelength was usually selected to correspond with an absorption wavelength for the material component being measured. An example of this type of apparatus was shown in United States Patent 3,150,264, issued Sept. 22, 1964.

Measurement of coating thickness with infrared radiation has been proposed using the reflection of radiation from an opaque substrate. The radiation wavelength was chosen to be absorbed substantially by the coating. United States Patent 3,017,512, issued Jan. 16, 1962, described such an apparatus.

Other apparatuses have employed radiation detectors along a moving material to measure a characteristic, by comparison of the measurements from the detectors. In United States Patent 2,611,974, issued Sept. 30, 1952, the moisture content of a material was measured by measuring the black body radiation from a running web at critical points. In United States Patent 3,044,297, issued July 17, 1962, the temperature of a material was measured.

The aforementioned prior art is good background to use in introducing the present invention, which is entirely new in method and concept, but which uses much of the apparatus of the prior art.

Briefly described, it has been discovered that the measurement of coating thickness can be accomplished by irradiating a material having a coating with infrared radiation. After irradiation, the black body radiation from the material is measured. The measured radiation intensity can be correlated with the thickness of the coating. This method is in contrast to the prior art reflective type coating thickness measuring method. The irradiation according to the present invention heats the material and causes the material to emit black body irradiation which is measured.

The present invention can be described in detail with reference to preferred embodiments as depicted in the figures, wherein FIGURE 1 is a schematic diagram of the step of irradiating a material in accordance with the method of the present invention.

FIGURE 2 is a schematic diagram of the step of measuring the black body radiation from the irradiated material shown in FIGURE 1, in accordance with the method of the present invention.

FIGURE 3 is another preferred embodiment of the invention for measuring the coating thickness of a moving material.

In the several figures, the same parts are identified by the same reference numerals.

While the following description specifies the application of the present invention to a particular product—measurement of plastic film thickness on paper, it must be recognized that the thickness of other coating materials on different substrates can be measured using the method of the present invention.

The general problem is to obtain a useful measurement responsive primarily to coating thickness. The solution is to use infrared radiation to heat the material and thereafter measure the black body radiation from the irradiated material. The method is illustrated by reference to FIGURES 1 and 2, wherein a material 1 comprises a substrate 2, such as paper, and a coating 3, such as plastic. Material 3 can be a flat sheet, here shown in elevation and cross-sectioned. Between coating 3 and substrate 2 is interface 7, the junction between the lower surface of coating 3 and the upper surface of substrate 2. The upper surface of coating 3 is irradiated over a defined area with a beam of infrared radiation 4 from a source 5. Source 5 is energized by a power supply 6.

The irradiation of material 1 causes it to heat up. The irradiation must be for a given period of time. The period can be controlled in several ways, such as de-energizing source 5 or placing a shield between source 5 and material 1 to completely cut-off the radiation. Alternatively, the period of irradiation can be controlled by inserting material 1 only for a given time duration.

The heat produced in material 1 causes it to act as a radiation emitting body. This radiation is called black body radiation. The black body radiation from material 1 is substantially a function of the thickness of coating 3.

The measurement step is shown in FIG. 2. An infrared detector 8 is positioned over the irradiated coating surface and the black body radiation 9 from material 1 is measured. Detector 8 produces an electrical signal that is coupled to an indicator 10 calibrated in units of thickness. Correlation between thickness of coating 3 and the intensity of black body radiation 9 is established by tests performed on samples of the same substrate with different thicknesses of the same coating material. As each sample is successively placed at the same position for a given period of time in front of source 5, and then placed successively in a position in front of detector 8, the black body radiation intensity is a function of the thickness of coating 3. The measurement can be tailored for a particular material to improve the accuracy by selecting the optimum radiation wavelength.

The period of irradiation, as well as the time between the end of irradiation and the measurement step, also can be selected for optimum accuracy. Material 1 and the samples also should be substantially uniform except for variations in coating thickness for reliable measurement.

The signal from detector 8 can be indicated in several ways, such as on a galvanometer or recorded. The type of infrared source 5, power supply 6, and detector 8 can be of any standard design to function as stated above. For example, a pulsed source can be used to preset the irradiation time. A radiation thermometer of the chopper type can be employed for detector 8.

One apparatus set-up for using the present invention can comprise an infrared lamp for source 5, energized by conventional electrical current from power supply 6, with irradiation time controlled by a shutter. Detector 8 can be a bolometer with a focusing mirror and indicator 10 can be a current meter. The lamp has a wide band of radiation wavelengths. Tests with this arrangement on milk cartons, where the plastic coatings on opposite sides of the paper base were 1.1 and 0.6 mils, produced a measurable difference in the black body radiation, with irradiation times of 1–10 seconds.

For plastic coated paper, such as in the abovementioned experiment, the radiation beam from source 5 can comprise one or more wavelengths which are at least partially absorbed by coating 3. The remaining radiation can be absorbed in substrate 2. The heat produced by the radiation in coating 3 is relatively small, since the thickness is usually much less than the thickness of substrate 2 and the emissivity factor E is low. Substrate 2 is heated by the irradiation and does emit substantial radiation due to its temperature. This black body radiation is defined by the law of Stephan-Boltzmann. $W = E_r \sigma T^4$ where $W$ = total radiation energy per second
$E_r$ = emissivity ($0 \leq E \leq 1$)
$T$ = absolute temperature of the body
$\sigma$ = radiation constant $5.75 \times 10^5$ ergs/cm.$^2$/sec./$T^4$ Black body radiation 9 from the paper substrate 2 is substantially a function of the thickness of coating 3, and emanates substantially from plastic-paper interface 7, being essentially a function of the interface, i.e. the temperature of the upper surface of substrate 2. The relationship for plastic coated paper is probably due to the fact that the amount of radiation reaching substrate 2 depends on the amount absorbed in coating 3. The more radiation absorbed in coating 3 (greater the thickness), the less radiation that reaches substrate 2 and the less black body radiation. The source radiation wavelength can be selected for optimum accuracy, to produce only a small absorption in coating 3 while having substantially all the remaining radiation absorbed in substrate 2.

Another embodiment of the present invention is shown in FIG. 3, where material 1 is moving in the direction indicated by arrow 11, exiting from a coating device, for example. Along the direction of material movement is disposed a gauge 12 comprising source 5, and spaced therefrom in the direction of material movement is detector 8. Source 5 and detector 8 are aligned longitudinally of material 1 so that the irradiated surface area of coating 3 passes under detector 8. If desired, gauge 12 can scan transversely. Material 1 moves longitudinally at a constant speed.

Material 1 is irradiated with infrared radiation as it passes source 5. Either a continuous or pulsed irradiation can be used. With continuous irradiation, the radiation reaching detector 8 can be chopped to produce a pulsating signal from detector 8, the amplitude of which is a function of the intensity of black body radiation 9. This signal can be integrated (demodulated) to derive a signal which is a function of coating thickness. When the irradiation is pulsating at a given rate, the detector radiation need not be chopped. Gauge 12 provides a continuous measurement of coating thickness and the detector signal can be used to control the coating thickness to a desired standard.

Other arrangements of source and detector can be used to provide measurement of coating thickness in accordance with the present invention.

The measurement of coating thickness, as described above, can also be restated in terms of measuring density or weight per unit area. As mentioned in the introduction, thickness has been used as an equivalent to these terms. For example, instead of measuring thickness (caliper), gauge 12 can be calibrated in units of coating density, assuming a constant coating thickness (caliper) and constant coating composition. Gauge 12 can also be calibrated in units of coating weight per unit area.

Having described preferred embodiments of apparatus for practicing the method of the present invention, modifications and other apparatus are apparent to one skilled in the art. The scope of the property rights on the present invention is to include the method practiced by these alternative apparatuses when within the scope of one or more of the appended claims.

What is claimed is:

1. A method of measuring the thickness of a coating on a substrate of a material with radiation in the infrared spectrum, comprising the steps of:

heating said material with said radiation, measuring the temperature of the substrate interface surface, and correlating said measured temperature with the thickness of said coating.

2. A method of measuring the thickness of a coating on a substrate of a material with radiation in the infrared spectrum, comprising the steps of:

irradiating a defined surface area of said coating with said radiation, to cause black-body radiation emission from said material, measuring the black body radiation intensity from said material, correlating said measured radiation intensity with the thickness of said coating.

3. A method of measuring the thickness on a coating on a substrate of a material with radiation in the infrared spectrum, comprising the steps of:

initially irradiating said material with said radiation to cause black-body radiation emission from said material, terminating the irradiation of said material, measuring the black body radiation intensity; from said irradiated material caused by said irradiation, correlating said measured black-body radiation intensity with the thickness of said coating.

4. A method of measuring the thickness of a coating on a substrate of a moving material with radiation in the infrared spectrum, comprising the steps of:

irradiating said material with said radiation in a defined surface area of said coating at one position along the direction of said material to cause black-body radiation emission from said substrate, measuring the black body radiation from said substrate at a second position spaced from said one position in the direction of material movement, and correlating said measured radiation intensity with the thickness of said coating.

5. A method of measuring the thickness of a coating on a substrate comprising the steps of:

irradiating said coating with infrared radiation which is partially absorbed by said coating to heat said substrate, producing black-body radiation, measuring the black-body radiation emitted by said substrate as a result of said infrared absorption, and correlating said measured substrate radiation with the thickness of said coating.

6. A method of measuring the thickness of an energy absorbing coating on a substrate comprising the steps of:

irradiating said energy absorbing coating with infrared radiation which is partially absorbed by said coating to cause black-body radiation emission from said substrate, measuring the intensity of said black-body radiation emitted from said substrate, and correlating said mesured black-body radiation intensity with the thickness of said coating.

7. A method of measuring the thickness of a plastic coating on a moving paper sheet comprising the steps of:

irradiating said plastic coating with infrared radiation at one position along the direction of said sheet movement, said infrared radiation being partially absorbed by said coating to cause black-body radiation emission from said paper sheet in accordance with the thickness of said coating, measuring the intensity of the black-body radiation emitted from said paper sheet at a different position along said direction of sheet movement, and correlating said measured black-body radiation intensity with the thickness of said plastic coating.

8. A method of measuring the thickness of a plastic coating on a paper sheet comprising the steps of:

irradiating said plastic coating with infrared radiation, said infrared radiation being partially absorbed by said coating to cause black-body radiation emission from said paper sheet in accordance with the thickness of said coating, measuring the intensity of the black-body radiation emitted from said paper sheet, and correlating said measured black-body radiation intensity with the thickness of said plastic coating.

References Cited

UNITED STATES PATENTS

| | | | |
|---|---|---|---|
| 3,043,956 | 7/1962 | Cohen | 250—83.3 |
| 3,188,256 | 6/1965 | Shoemaker | 250—83.3 X |
| 3,206,603 | 9/1965 | Mauro | 250—83.3 |

ARCHIE R. BORCHELT, *Primary Examiner.*